US012331545B2

(12) United States Patent
Maliy et al.

(10) Patent No.: US 12,331,545 B2
(45) Date of Patent: Jun. 17, 2025

(54) SHELF ASSEMBLY WITH HIDDEN COMPARTMENT AND MULTI-STAGE LOCK

(71) Applicants: Vladimir Maliy, Detroit, MI (US); Alexander Zelikov, Farmington Hills, MI (US)

(72) Inventors: Vladimir Maliy, Detroit, MI (US); Alexander Zelikov, Farmington Hills, MI (US)

(73) Assignee: Vladimir Malin, Detroit, MI (US)

( * ) Notice: Subject to any disclaimer, the term of this patent is extended or adjusted under 35 U.S.C. 154(b) by 172 days.

(21) Appl. No.: 18/296,084

(22) Filed: Apr. 5, 2023

(65) Prior Publication Data

US 2023/0399871 A1 Dec. 14, 2023

Related U.S. Application Data

(60) Provisional application No. 63/352,150, filed on Jun. 14, 2022.

(51) Int. Cl.
*E05B 15/04* (2006.01)
*E05B 9/08* (2006.01)

(52) U.S. Cl.
CPC ................ *E05B 15/04* (2013.01); *E05B 9/08* (2013.01); *E05B 2015/0403* (2013.01)

(58) Field of Classification Search
CPC .... E05B 15/04; E05B 9/08; E05B 2015/0403; Y10T 70/5009
USPC ........................................................ 70/57–63
See application file for complete search history.

(56) References Cited

U.S. PATENT DOCUMENTS 5,111,755 A * 5/1992 Rouse ........................ E05G 1/00 109/47
5,329,865 A * 7/1994 McWard ................... E05G 1/04 109/50
5,407,261 A * 4/1995 Mercer ................ A47B 46/005 312/248
5,713,650 A * 2/1998 King ...................... A47C 19/22 5/2.1
5,760,689 A * 6/1998 Holmgren ............... A47F 3/002 70/57.1
7,770,986 B1 * 8/2010 Simaitis ............... A47B 46/005 312/246
9,470,020 B2 * 10/2016 Eto ....................... E05B 65/006
12,155,110 B2 * 11/2024 Shrivastava ............. H01Q 5/25
2012/0080890 A1 * 4/2012 Loret de Mola ......... E05C 1/14 292/164

* cited by examiner

*Primary Examiner* — Suzanne L Barrett
(74) *Attorney, Agent, or Firm* — Alexander Zelikov

(57) ABSTRACT

A shelf assembly includes a receptacle having first, second, third, and fourth lateral sides and a receptacle floor defining a compartment. The shelf assembly also includes a shelf configured to engage the receptacle at the second and third lateral sides and slide along the second and third lateral sides between a closed position to thereby cover and hide the compartment and an open position to thereby expose the compartment. The shelf assembly additionally includes a sequential multi-stage lock configured to control access to the compartment.

18 Claims, 13 Drawing Sheets

SHELF ASSEMBLY WITH HIDDEN COMPARTMENT AND MULTI-STAGE LOCK

CROSS-REFERENCE TO RELATED APPLICATION(S)

This application claims the benefit of U.S. Provisional Application Ser. No. 63/352,150 filed Jun. 14, 2022, the entire content of which is hereby incorporated by reference.

INTRODUCTION

The present disclosure relates to a shelf assembly with a hidden compartment incorporated therein and a multi-stage lock for access thereto.

A shelf is generally a flat, horizontal plane used for displaying or storing various items. A shelf is typically raised off the floor and often anchored to a wall, supported on its shorter length sides by brackets or otherwise anchored to cabinetry by brackets, dowels, screws, or nails. A shelf may also be held up by columns or pillars. A shelf may be attached to a wall or other vertical surface, be suspended from a ceiling, be a part of a free-standing frame unit, or may be part of a piece of furniture such as a cabinet, bookcase, entertainment center, etc. Free-standing shelves may be accessible from either one or both longer length sides.

SUMMARY

A shelf assembly includes a receptacle having first, second, third, and fourth lateral sides and a receptacle floor configured to define a compartment. The shelf assembly also includes a shelf configured to engage the receptacle at the second and third lateral sides and slide along the second and third lateral sides between a closed position to thereby cover and hide the compartment and an open position to thereby expose the compartment. The shelf assembly additionally includes a sequential multi-stage lock configured to control access to the compartment.

The sequential multi-stage lock may include a latch mechanism configured to selectively lock the shelf to the receptacle in the closed position and unlock the shelf to facilitate shifting of the shelf into the open position. The sequential multi-stage lock further includes an articulating support mechanism configured to selectively block actuation of the latch mechanism to maintain closed position of the shelf and unblock actuation of the latch mechanism to facilitate sliding of the shelf into the open position to expose the compartment. The articulating support mechanism may be additionally configured to support the shelf in the closed position.

The shelf assembly may also include at least one moveable buttress mounted to the fourth lateral side and operatively connected to the articulating support mechanism.

The articulating support mechanism may include at least one rod operatively connected to the at least one moveable buttress and configured to shift along the fourth lateral side and to support the shelf in the closed position to thereby block actuation of the latch mechanism.

The articulating support mechanism may include a first rod and a second rod, each configured to extend perpendicular to the receptacle floor to support the shelf in the closed position and thereby block actuation of the latch mechanism.

The articulating support mechanism may additionally include a linkage configured to operatively connect and shift each of the first and second rods.

The linkage may include a first link, a second link, and a seesaw element. The first link may be pivotably connected to each of the seesaw element and the first rod. The second link may be pivotably connected to each of the seesaw element and the second rod. The linkage may be thereby configured to shift the respective first and second rods synchronously to selectively block and unblock actuation of the latch mechanism.

The sequential multi-stage lock may additionally include a pawl mechanism configured to selectively block and unblock movement of the seesaw element.

The pawl mechanism may include a dog configured to pivotably engage a groove in the seesaw element. The dog may be loaded by a spring into engagement with the groove to block movement of the seesaw element and actuation of the latch mechanism.

The articulating support mechanism may include a first rotatable cam operatively connected to the first rod and a second rotatable cam operatively connected to the second rod.

One or more moveable buttresses may be arranged between the receptacle floor and the fourth lateral side. Additionally, the moveable buttresses may include a first rotatable buttress operatively connected to the first cam and a second rotatable buttress operatively connected to the second cam.

The latch mechanism may include a catch mounted to the shelf and a flange mounted to the fourth lateral side includes. The catch may be configured to engage and clasp the flange.

The shelf may include a shelf surface constructed from a flexible material. The flexible material may enable the shelf to deflect to release the catch from the flange when the shelf is subjected to an actuation force perpendicular to the shelf surface and the articulating support mechanism has unblocked actuation of the latch mechanism.

The latch mechanism may include a plunger mounted to the fourth lateral side and configured to contact and press the catch against the flange.

The fourth lateral side may include a pocket. In such an embodiment, the latch mechanism may additionally include an elastic element, such as a coil spring), arranged in the pocket and configured to urge the plunger against the flange via an elastic force.

Each of the catch, the flange, and the plunger may include a respective beveled contact surface configured to deflect the catch around the flange and shift the plunger via the catch against the elastic force. Accordingly, the deflection of the catch around the flange via the respective beveled contact surfaces facilitates locking of the shelf to the receptacle in the closed position.

Each of the second and third lateral sides of the receptacle may include a relief configured to facilitate selective deflection of the catch around the flange for locking of the shelf to the receptacle in the closed position and deflection of the catch around the flange for unlocking and shifting of the shelf into the open position.

The first lateral side of the receptacle may have a greater height than each of the second and third lateral sides.

The shelf may include a skirt having a first, second, and third skirt portions. In such an embodiment, the second and third skirt portions may be configured to overhang and cover the respective relief on each of the second and third lateral sides of the receptacle.

Each of the second and third skirt portions may define a respective channel and each of the second and third lateral sides of the receptacle may define a respective ledge. The individual ledges are configured to match up with the respective channels to thereby facilitate sliding engagement of the shelf relative to the receptacle.

The fourth lateral side may define at least one aperture configured to accept a fastener for mounting the shelf assembly to an object.

The fourth lateral side may define a recess configured to house the articulating support mechanism.

At least one of the receptacle and the shelf may be constructed from a polymeric material. Alternatively, the receptacle and/or the shelf may be constructed from metal.

The above features and advantages, and other features and advantages of the present disclosure, will be readily apparent from the following detailed description of the embodiment (s) and best mode(s) for carrying out the described disclosure when taken in connection with the accompanying drawings and appended claims.

DETAILED DESCRIPTION

Figure 1A:
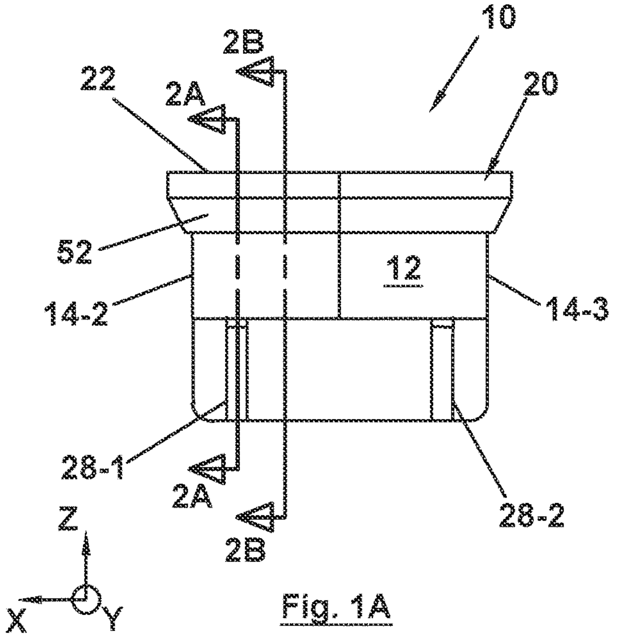
FIG. 1A illustrates a front plan view of a shelf assembly for arranging and/or displaying items thereon and for storage of additional items out-of-sight in an accessible hidden compartment, depicting a receptacle and a shelf; according to the disclosure.

Those having ordinary skill in the art will recognize that terms such as "above", "below", "upward", "downward", "top", "bottom", "left", "right", etc., are used descriptively for the figures, and do not represent limitations on the scope of the disclosure, as defined by the appended claims.

Referring to the drawings, wherein like reference numbers refer to like components, FIGS. 1-11 show various views and embodiments of a shelf assembly 10 arranged in a three-dimensional X-Y-Z space, according to the present disclosure. As shown, the shelf assembly 10 is adapted for arranging and/or displaying various items thereon. As will be described in detail below, the shelf assembly 10 is also configured to permit storage of additional items out-of-sight in an accessible hidden or secret compartment. The shelf assembly 10 is additionally adapted to be anchored to another object, such as a wall surface, joist, or cabinetry by appropriate fasteners, such as brackets, dowels, screws, or nails.

Figure 1B:
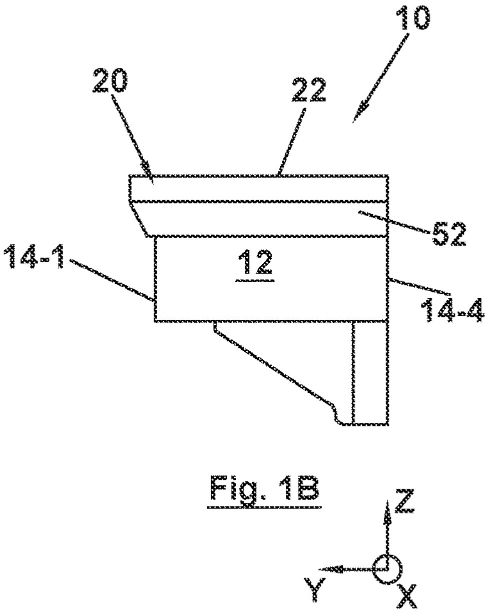
FIG. 1B illustrates a side plan view of the shelf assembly, according to the disclosure.
Figure 1C:
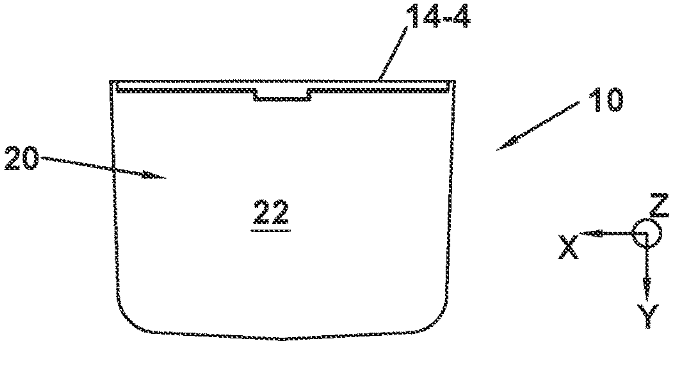
FIG. 1C illustrates a top view of a shelf assembly, according to the disclosure.

As shown in FIGS. 1A, 1B, and 1C, the shelf assembly 10 includes a receptacle 12 having first, second, third, and fourth lateral sides 14-1, 14-2, 14-3, 14-4. The first, second, third, and fourth lateral sides 14-1, 14-2, 14-3, 14-4, together with a receptacle floor 16, define a compartment 18 (shown in FIGS. 2A and 2B). The compartment 18 may be configured, i.e., shaped and sized, to hold item(s) generally not intended for display. The shelf assembly 10 also includes a shelf 20 defining a shelf surface 22 for supporting and/or displaying various items. The shelf 20 is configured to engage the receptacle 12 at the second lateral side 14-2 and the third lateral sides 14-3 and slide along the second and third lateral sides between a first or closed position P1 (for example, shown in FIG. 6A) to thereby cover and hide the compartment 18 and a second or open position P2 (for example, shown in FIG. 6B) to thereby expose the compartment 18. The shelf 20 is intended to engage the receptacle 12 at the first lateral side 14-1 and slide toward the fourth lateral side 14-4. The receptacle 12 and/or the shelf 20 may be constructed, e.g., molded, from a semi-rigid polymeric material, such that some sections of the shelf or receptacle may exhibit purposeful elasticity. Alternatively, the receptacle 12 and/or the shelf 20 may be constructed from a rigid material, such as cut/carved/machined and assembled, for example out of wood, or formed, e.g., cast, from metal.

Figure 2A:
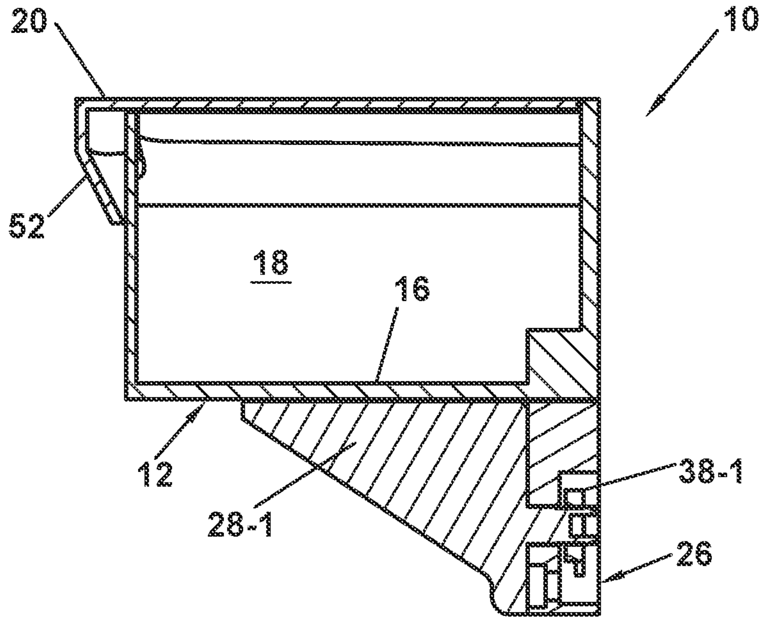
FIG. 2A illustrates a cross-sectional side view of the shelf assembly shown in FIG. 1A, depicting a section through an articulating support mechanism operatively connected to a moveable buttress in a sequential multi-stage lock, according to an embodiment of the disclosure.
Figure 2B:
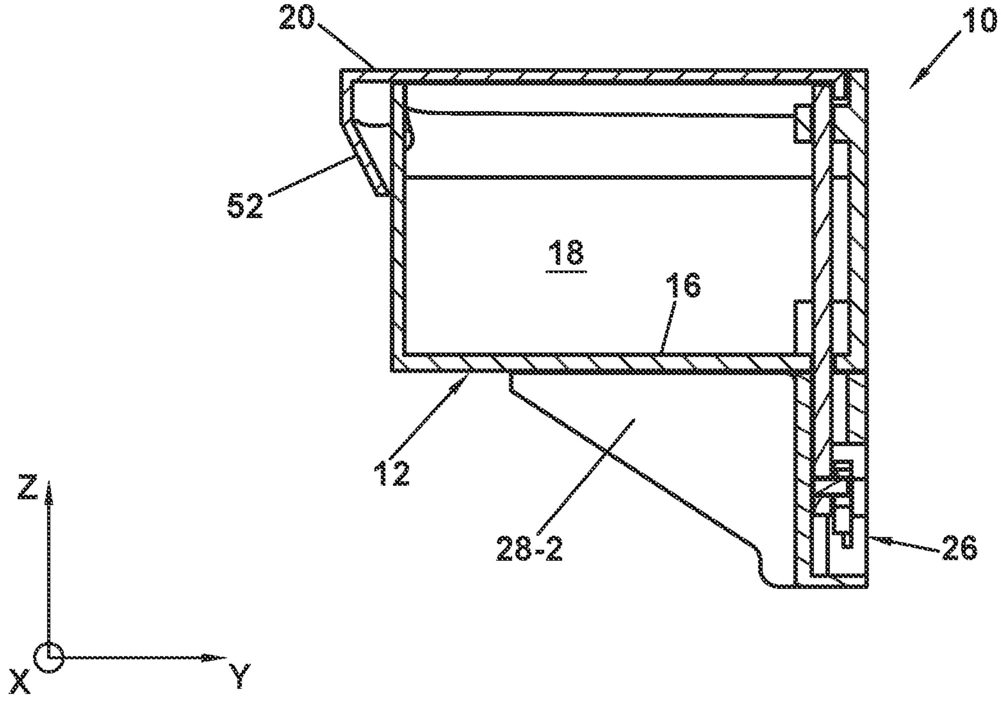
FIG. 2B illustrates another cross-sectional side view of the shelf assembly shown in FIG. 1A, depicting a section through a cam and a rod operatively connected to the moveable buttress in the sequential multi-stage lock, according to an embodiment of the disclosure.
Figure 3A:
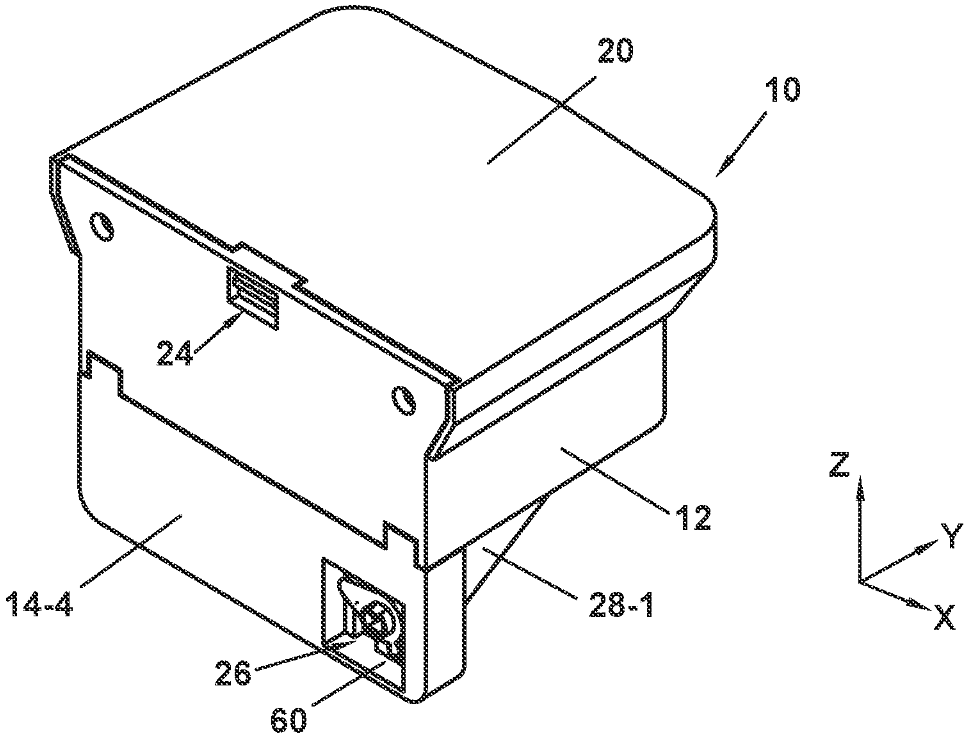
FIG. 3A illustrates a perspective rear plan view of the shelf assembly shown in FIGS. 1A-1C, depicting a latch mechanism and part of the articulating support mechanism, according to an embodiment of the disclosure.
Figure 3B:
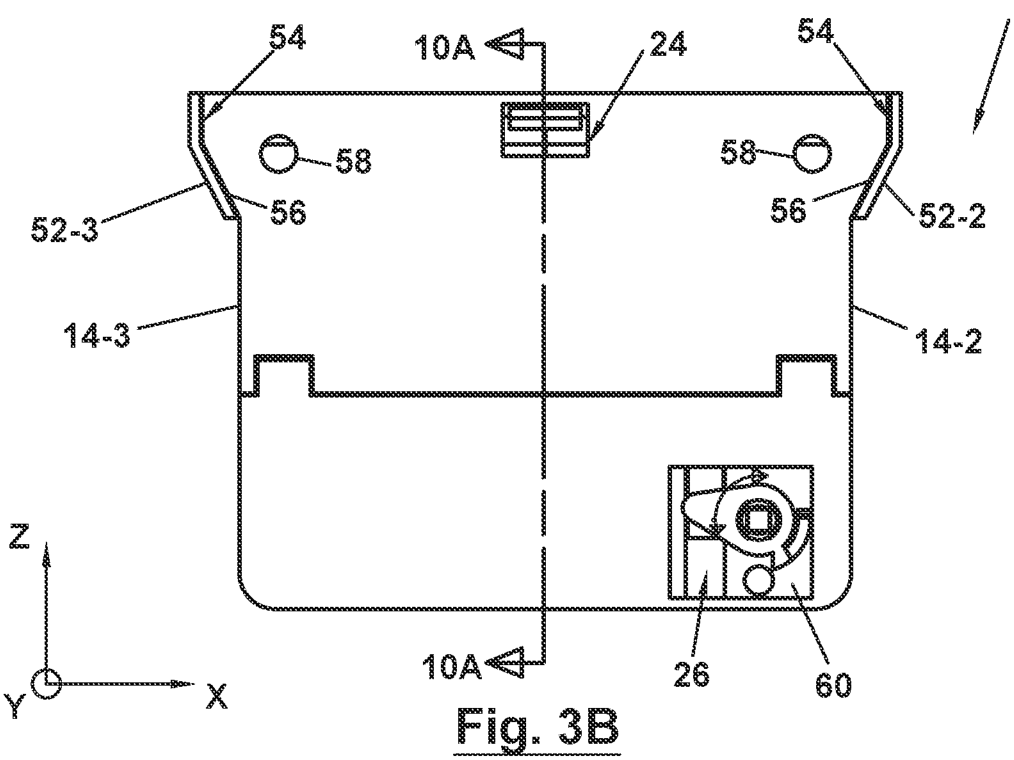
FIG. 3B illustrates a rear plan view of the shelf assembly shown in FIGS. 1A-1C, depicting the latch mechanism and part of the articulating support mechanism, according to an embodiment of the disclosure.
Figure 4:
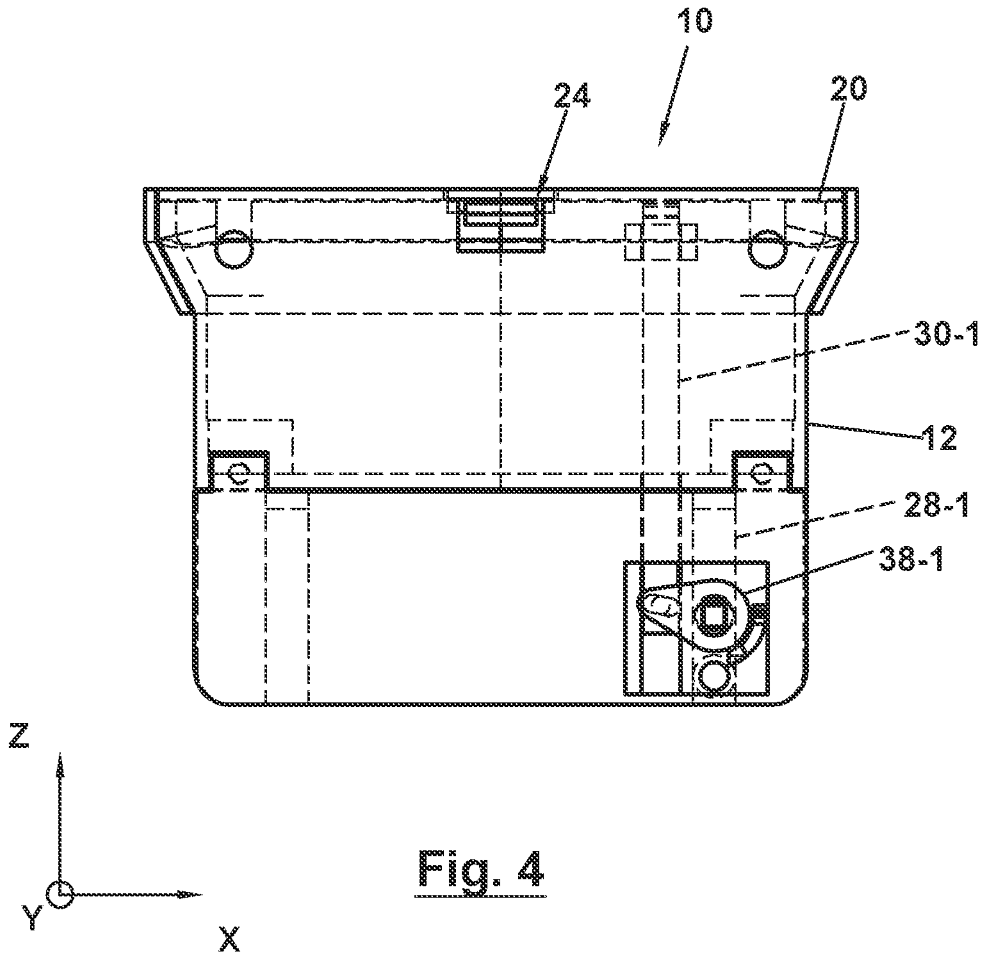
FIG. 4 illustrates a close-up rear view of the shelf assembly shown in FIGS. 1A-1C, depicting a spatial relationship the cam and rod components of the articulating support mechanism, according to an embodiment of the disclosure.
Figure 5:
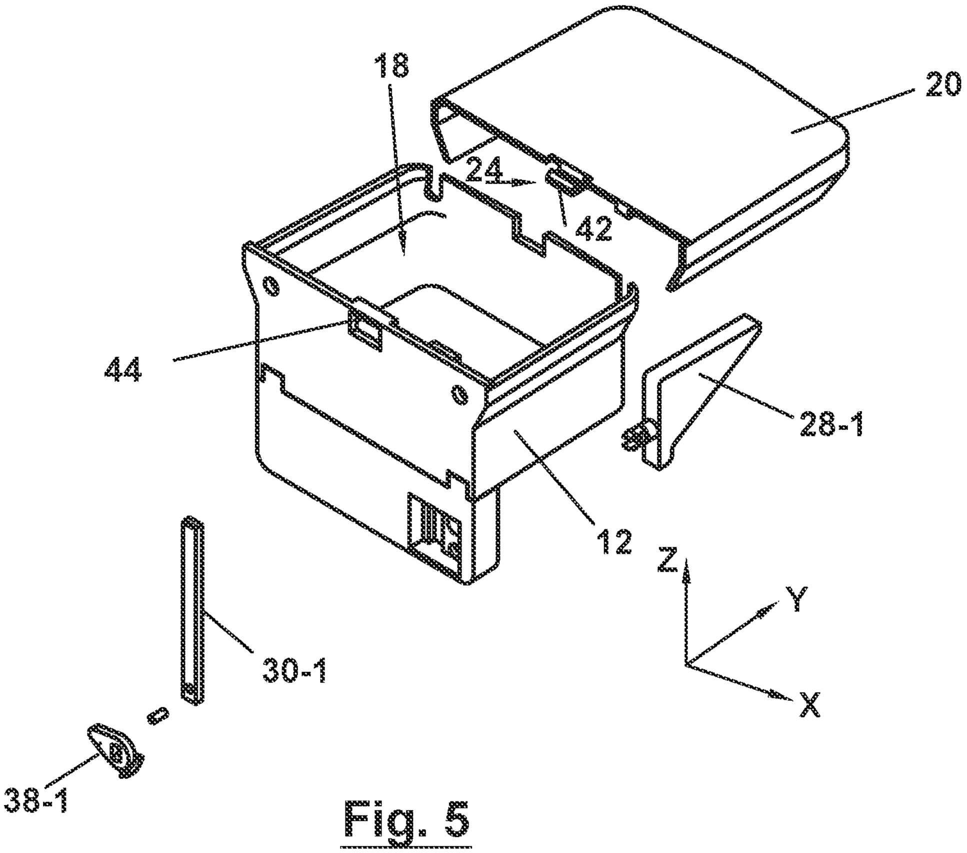
FIG. 5 illustrates an exploded perspective rear view of the shelf assembly shown in FIGS. 1A-1C, depicting components of the articulating support mechanism, according to an embodiment of the disclosure.

As shown in FIGS. 3A and 3B, the shelf assembly 10 also includes a latch mechanism 24 configured to selectively lock the shelf 20 to the receptacle 12 in the closed position P1 and unlock the shelf to facilitate shifting of the shelf into the open position P2. As shown in FIGS. 2A and 2B, the shelf assembly 10 additionally includes an articulating support mechanism 26 configured to selectively block actuation of the latch mechanism 24 to maintain the closed position P1 of the shelf 20. The articulating support mechanism 26 is further configured to selectively unblock actuation of the latch mechanism 24 to facilitate sliding of the shelf 20 into the open position P2 to expose the compartment 18. The articulating support mechanism 26 may be further configured to support the shelf 20 in the closed position P1, as will be described in detail below. Accordingly, the latch mechanism 24 and the articulating support mechanism 26 together provide the shelf assembly 10 with a sequential multi-stage lock.

As shown in FIGS. 2A and 2B, the shelf assembly 10 may also include at least one moveable or rotatable buttress, shown as first and second buttresses 28-1, 28-2. Although the buttress 28-1 is specifically depicted as the moveable buttress component, nothing precludes the buttress 28-2 from also, or alternatively, being configured to move relative to the receptacle 12. Each of the first and second buttresses 28-1, 28-2 may be arranged between the receptacle floor 16 and the fourth lateral side 14-4 and be mounted to the fourth lateral side 14-4. At least one of the first and second buttresses 28-1, 28-2 is operatively connected to the articulating support mechanism 26. The articulating support mechanism 26 may include at least one prop rod, shown as a first prop rod 30-1 in FIGS. 4 and 5. An alternative embodiment of the articulating support mechanism 26 is shown in FIGS. 6A, 6B, 7A, 7B, 8A, and 8B, which has two prop rods, depicted as a first prop-rod 30-1 and a second prop rod 30-2. The prop rods 30-1, 30-2 may include a respective first and second rod longitudinal axis 30-1A, 30-2A. Each of the first and second rods 30-1, 30-2 may be operatively connected to one of the buttresses 28-1, 28-2 and configured to shift along the fourth lateral side 14-4 in a substantially vertical direction, i.e., upward along the Z axis. When either of the first and second prop rods 30-1, 30-2 is extended into its uppermost position, the subject prop rod will support the shelf 20 in its closed position P1 and thereby block actuation of the latch mechanism 24. When two moveable prop rods are used, the first prop rod 30-1 will be arranged substantially parallel to the second prop rod 30-2 and each rod will extend substantially perpendicular to the receptacle floor 16 to support the shelf 20 in the closed position P1.

Figure 6A:
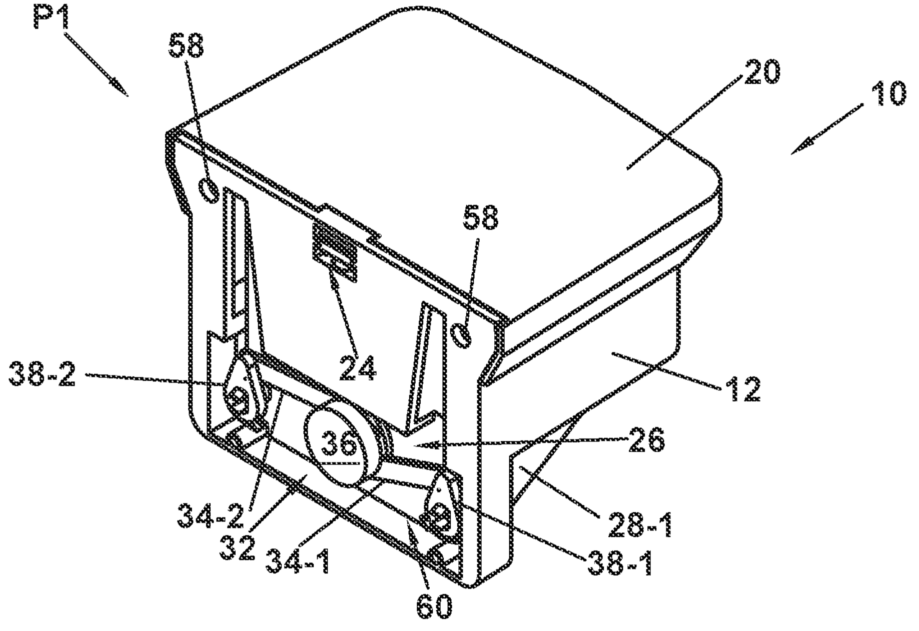
FIG. 6A illustrates a perspective rear view of the shelf assembly shown in FIGS. 1A-1C, having the articulating support mechanism operatively connected to two moveable buttresses according to another embodiment of the disclosure, depicting the shelf installed.
Figure 6B:
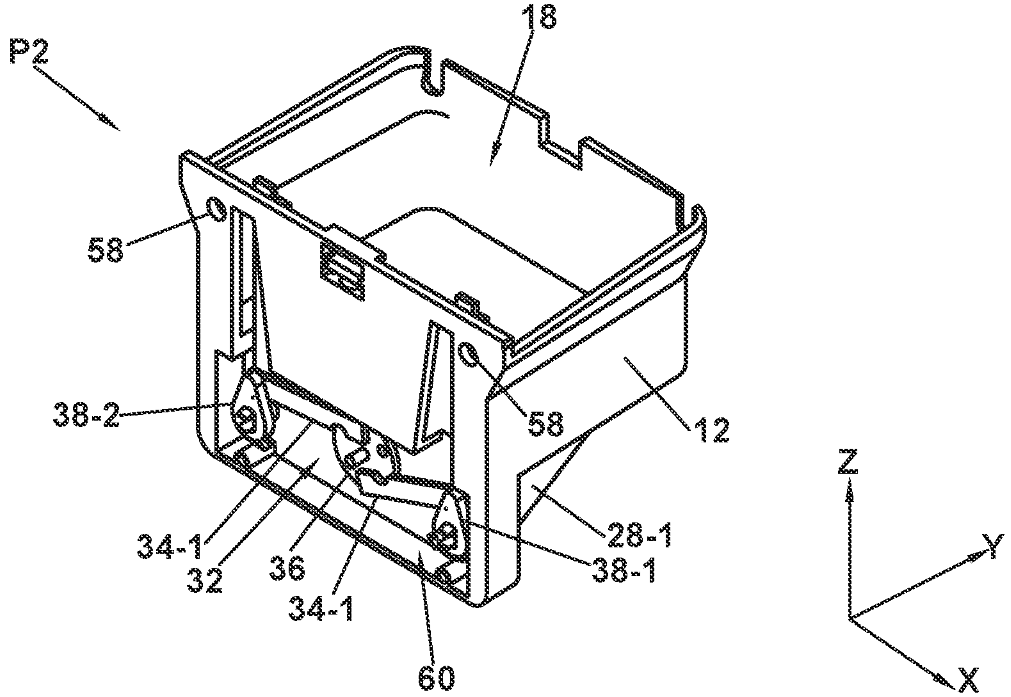
FIG. 6B illustrates a perspective rear view of the shelf assembly shown in FIGS. 1A-1C, having the articulating support mechanism operatively connected to two moveable buttresses according to another embodiment of the disclosure, depicting the shelf removed.

As shown in FIGS. 6A and 6B, the articulating support mechanism 26 may additionally include a linkage 32 configured to operatively connect and shift each of the first and second prop rods 30-1, 30-2. The linkage may include a first link 34-1, a second link 34-2, and a synchronizing seesaw element 36. As shown, the seesaw element 36 may be pivotably mounted to the fourth lateral side 14-4, e.g., centrally along the width of the fourth lateral side. The first link 34-1 may be pivotably connected to each of the seesaw element 36 and the first prop rod 30-1. Similarly, the second link 34-2 may be pivotably connected to each of the seesaw element 36 and the second prop rod 30-2. As may be seen in FIGS. 7A, 7B, 8A, and 8B, mounting points of the first link 34-1 and second link 34-2 on the seesaw 36 may be diametrically opposed. The linkage 32 may thereby be configured to shift the respective first and second prop rods 30-1, 30-2 synchronously, i.e., substantially in unison, to selectively block and unblock actuation of the latch mechanism 24. Accordingly, in the embodiment employing the seesaw element 36, either of the buttresses 28-1, 28-2 may be rotated to translate both first and second prop rods 30-1, 30-2.

Figure 7A:
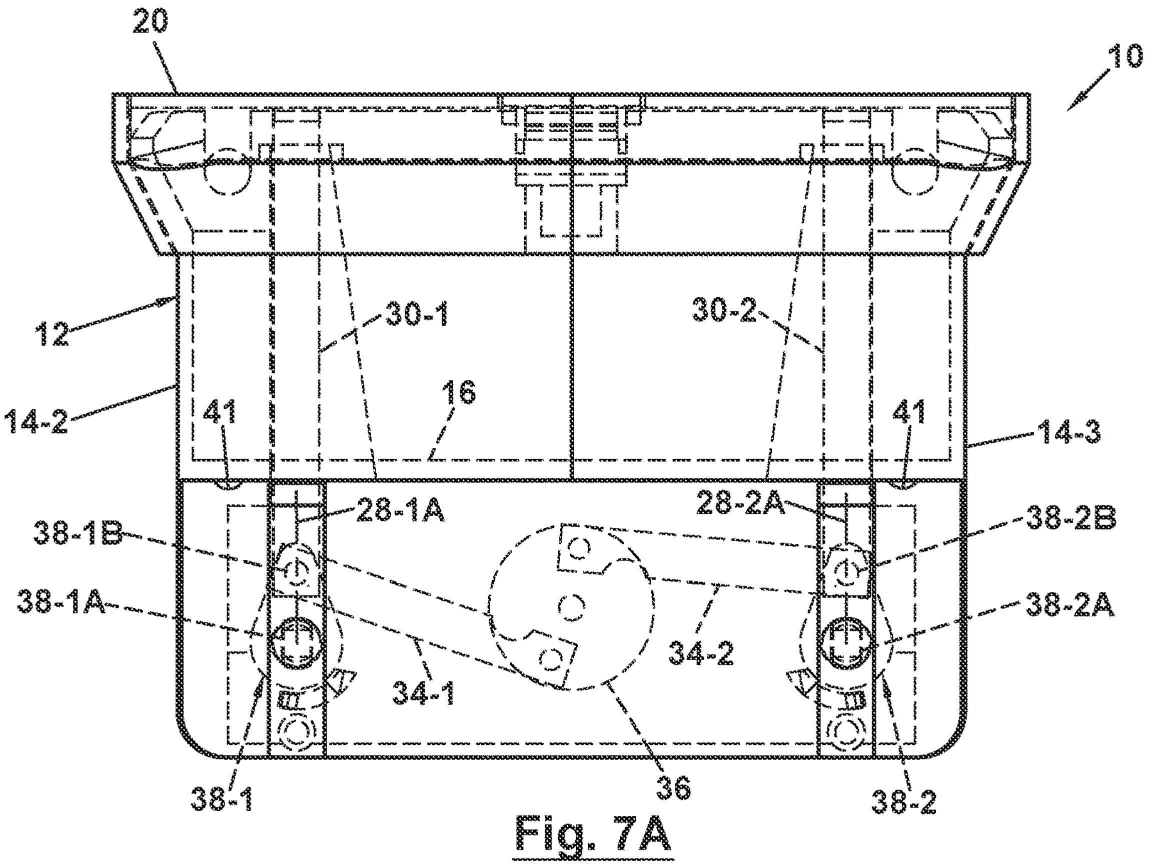
FIG. 7A illustrates a front plan view of the shelf assembly shown in FIGS. 6A and 6B, depicting the moveable buttresses in blocking orientation, according to an embodiment of the disclosure.
Figure 7B:
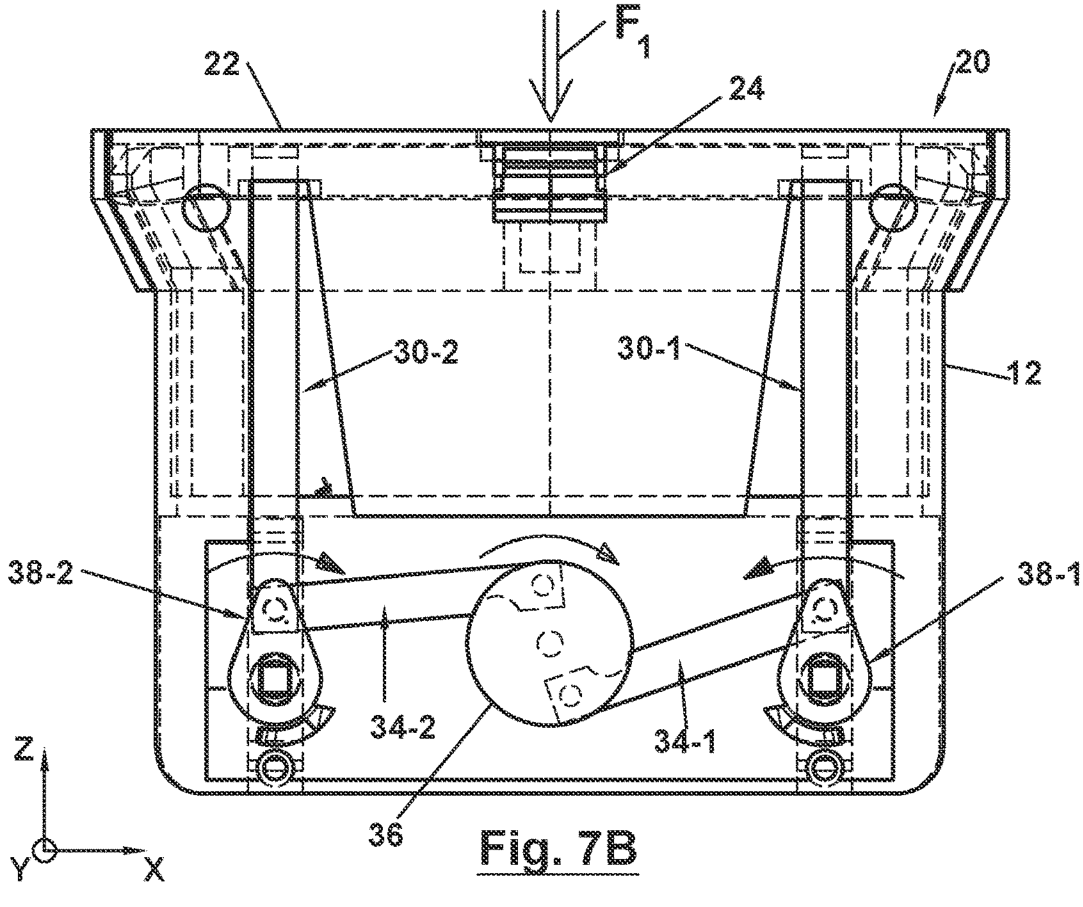
FIG. 7B illustrates a rear plan view of the shelf assembly shown in FIG. 7A, depicting the articulating support mechanism in blocking orientation, according to the disclosure.
Figure 8A:
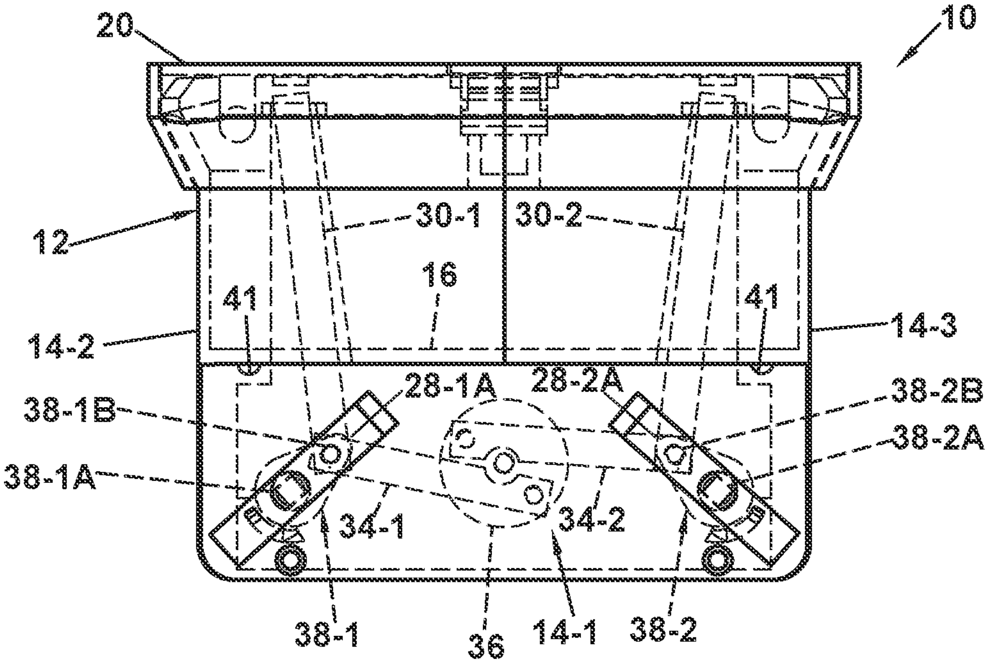
FIG. 8A illustrates a front plan view of the shelf assembly shown in FIGS. 6A and 6B, depicting the moveable buttresses in unblocking orientation, according to an embodiment of the disclosure.
Figure 8B:
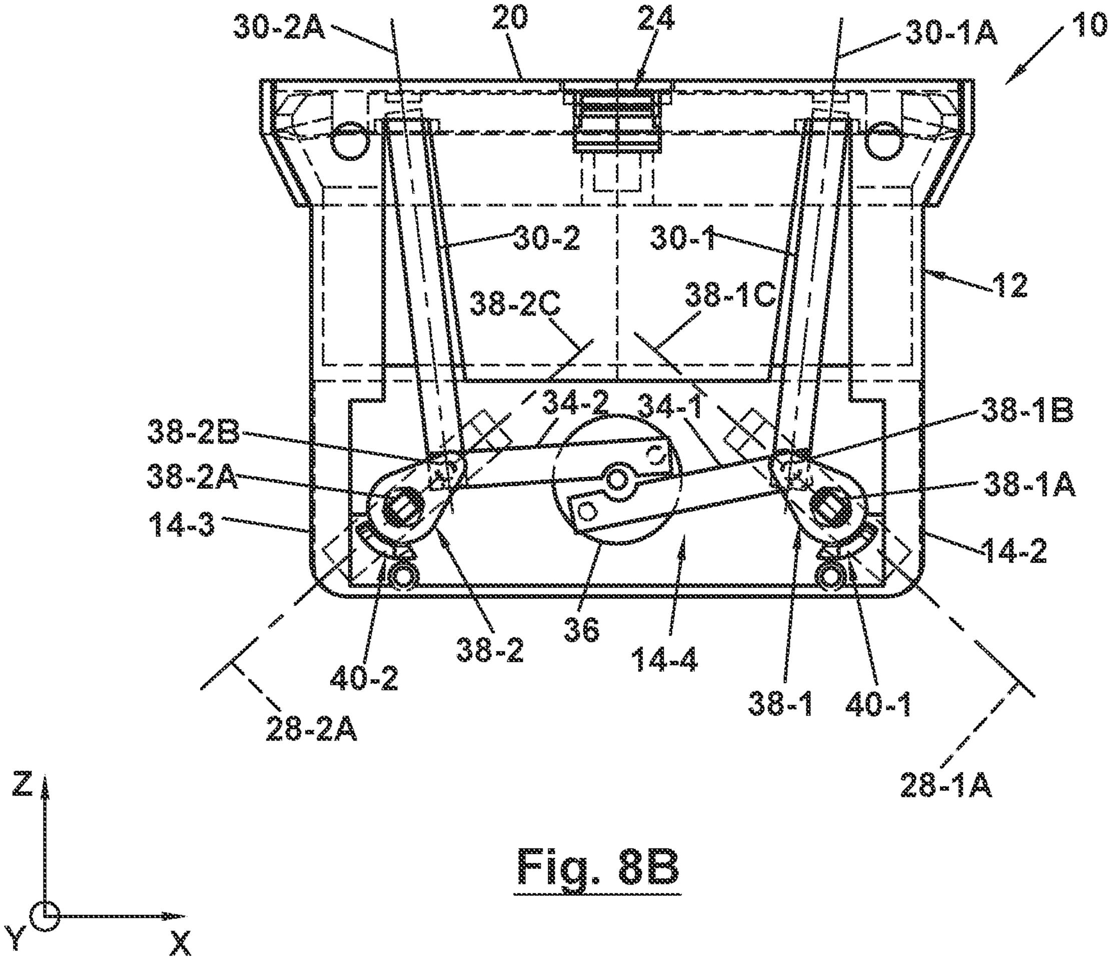
FIG. 8B illustrates a rear plan view of the shelf assembly shown in FIG. 7B, depicting the articulating support mechanism in unblocking orientation, according to the disclosure.

The articulating support mechanism 26 may further include a first rotatable cam 38-1 operatively connected to the first prop rod 30-1 and a second rotatable cam 38-2 operatively connected to the second prop rod 30-2 (shown in FIGS. 7B and 8B). In the embodiment having each of the first and second cams 38-1, 38-2, the first rotatable buttress 28-1 is operatively connected to the first cam and the second rotatable buttress 28-2 is operatively connected to the second cam. Specifically, the rotatable buttresses 28-1, 28-2 may be directly connected to the respective first and second cams 38-1, 38-2, e.g., mounted on a common rotational axis (arranged along the Y coordinate axis), such that actuation of the buttresses will rotate the respective cams and translate the corresponding first and second prop rods 30-1, 30-2. When used with the first and second links 34-1, 34-2 and the seesaw element 36, the first and second buttresses 28-1, 28-2 will turn or rotate in opposite directions. Alternatively, only one cam, such as the first cam 38-1, may be used in operative connection with the first rotatable buttress 28-1 for the embodiment shown in FIGS. 3A, 3B, 4, and 5.

As shown in FIG. 7B, the fourth lateral side 14-4 of the receptacle 12 may define a first cam stop 40-1 and a second cam stop 40-2, each stop configured to limit the travel of the respective first and second cam 38-1, 38-2 supporting the closed position P1 of the shelf 20. For example (as shown in FIG. 7B), each of the first and second cam stops 40-1, 40-2 may be defined by a respective niche in the fourth lateral side 14-4. The first and the second cams 38-1, 38-2 may have a respective first and second cam pivot point 38-1A, 38-2A and a respective connection point 38-1B, 38-2B to the corresponding first and second prop rod 30-1, 30-2. The first and the second cams 38-1, 38-2 may also have respective first and second cam axes 38-1C, 38-2C established between the corresponding first and second cam pivot points 38-1A, 38-2A and the respective connection points 38-1B, 38-2B to the first and second prop rods 30-1, 30-2. The first and second rotatable buttresses 28-1, 28-2 may include a respective first and second buttress longitudinal axis 28-1A, 28-2A, each substantially parallel to the fourth lateral side and arranged substantially in the Z direction when the respective prop rods are supporting the closed position P1 of the shelf 20.

Figure 9B:
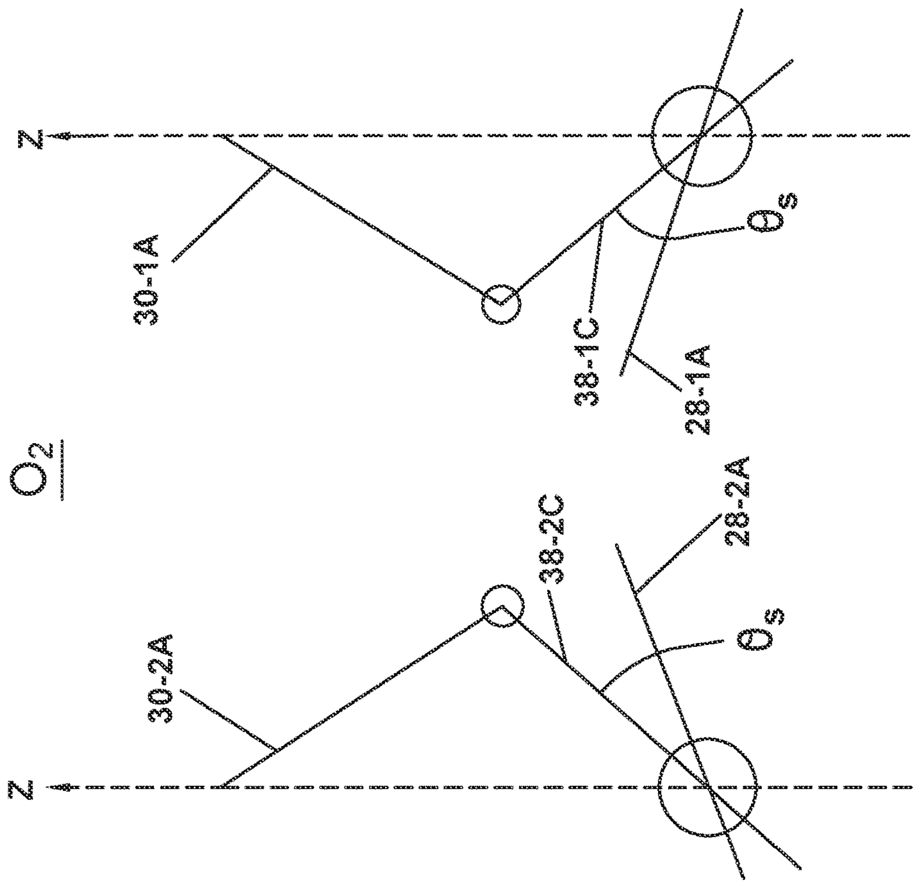
FIG. 9B is a diagram of angular relationship between the buttress, rod, and cam axes in each of the latch mechanism unblocking orientation, according to the disclosure.
Figure 9A:
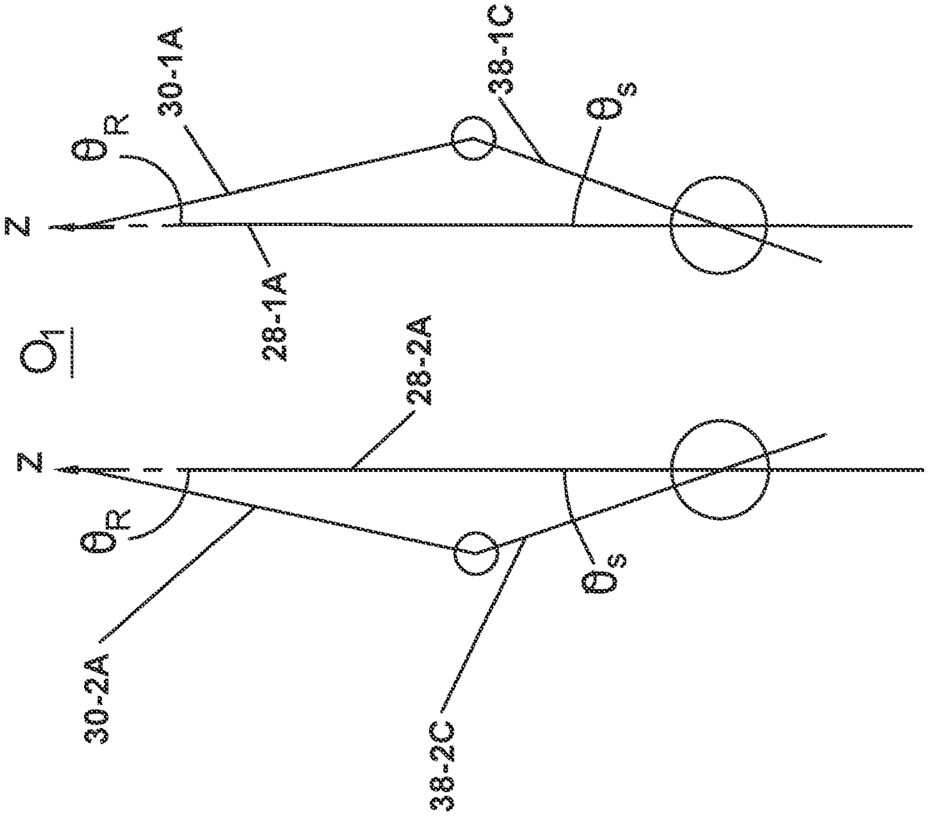
FIG. 9A is a diagram of angular relationship between the buttress, rod, and cam axes in each of the latch mechanism blocking orientation, according to the disclosure.

For illustrative purposes, FIGS. 9A and 9B specifically show blocking and unblocking positions of the articulating support mechanism 26 using respective prop rods 30-2, rotatable buttresses 28-1, 28-2, and cam 38-1, 38-2 axes. As shown, positions of axes of the prop rod 30-1, rotatable buttress 28-1, and cam 38-1 are mirror images of the positions of axes of prop rod 30-2, rotatable buttress 28-2, and cam 38-2. With reference to FIG. 9A, each of the first and second rotatable buttress axes 28-1A, 28-2A, prop rod axes 30-1A, 30-2A, and cam axes 38-1C, 38-2C may adopt a first orientation $O_1$ in which the respective first and second prop rods 30-2, 30-2 are configured to block actuation of the latch mechanism 24 (in the shelf closed position P1). Additionally, as shown in FIG. 9B, each of the first and second rotatable buttresses axes 28-1A, 28-2A, respective prop rod axes 30-1A, 30-2A, and cam axes 38-1C, 38-2C may adopt a second orientation $O_2$ in which the respective first and second prop rods 30-1, 30-2 are configured to unblock actuation of the latch mechanism 24 (in the shelf open position P2). A stagger angle $\theta_S$ may be included between the respective first and second cam axes 38-1C, 38-2C and the corresponding first and second buttress longitudinal axes 28-1A, 28-2A to urge the articulating support mechanism 26 to maintain its first orientation $O_1$ in the shelf closed position P1. In the first orientation $O_1$, the first and second prop rod longitudinal axes 30-1A, 30-2A may then also be positioned at some resultant non-zero angle $\theta_R$ (shown in FIG. 9A) with respect to the Z coordinate axis and the corresponding first and second buttress longitudinal axes 28-1A, 28-2A.

When the prop rods 30-1, 30-2 are generally standing straight up along the Z coordinate axis to support the shelf 20, the stagger angle $\theta_S$ facilitates the mass of the shelf to keep the cams 38-1, 38-2 and the buttresses 28-1, 28-2 from rotating toward the orientation $O_2$ prior to actuation of the buttress(s) 28-1, 28-2. Accordingly, in the intended shelf closed position P1, the stagger angle $\theta_S$ maintains the articulating support mechanism 26 in the $O_1$ orientation. The subject stagger angle $\theta_S$ may be in a range of 1 to 5 degrees, thereby establishing a similar magnitude for the angle $\theta_R$ relative to the Z coordinate axis. The receptacle 12 may also have individual detents or hard stops 41 (shown in FIG. 7A) configured to contact the respective first and second rotatable buttress 28-1, 28-2 and thereby establish their first orientation $O_1$ for blocking actuation of the latch mechanism 24. Each such detent or hard stop 41 may be positioned on or incorporated into the fourth lateral side 14-4 or the underside of the floor 16 of the receptacle 12.

Figure 10:
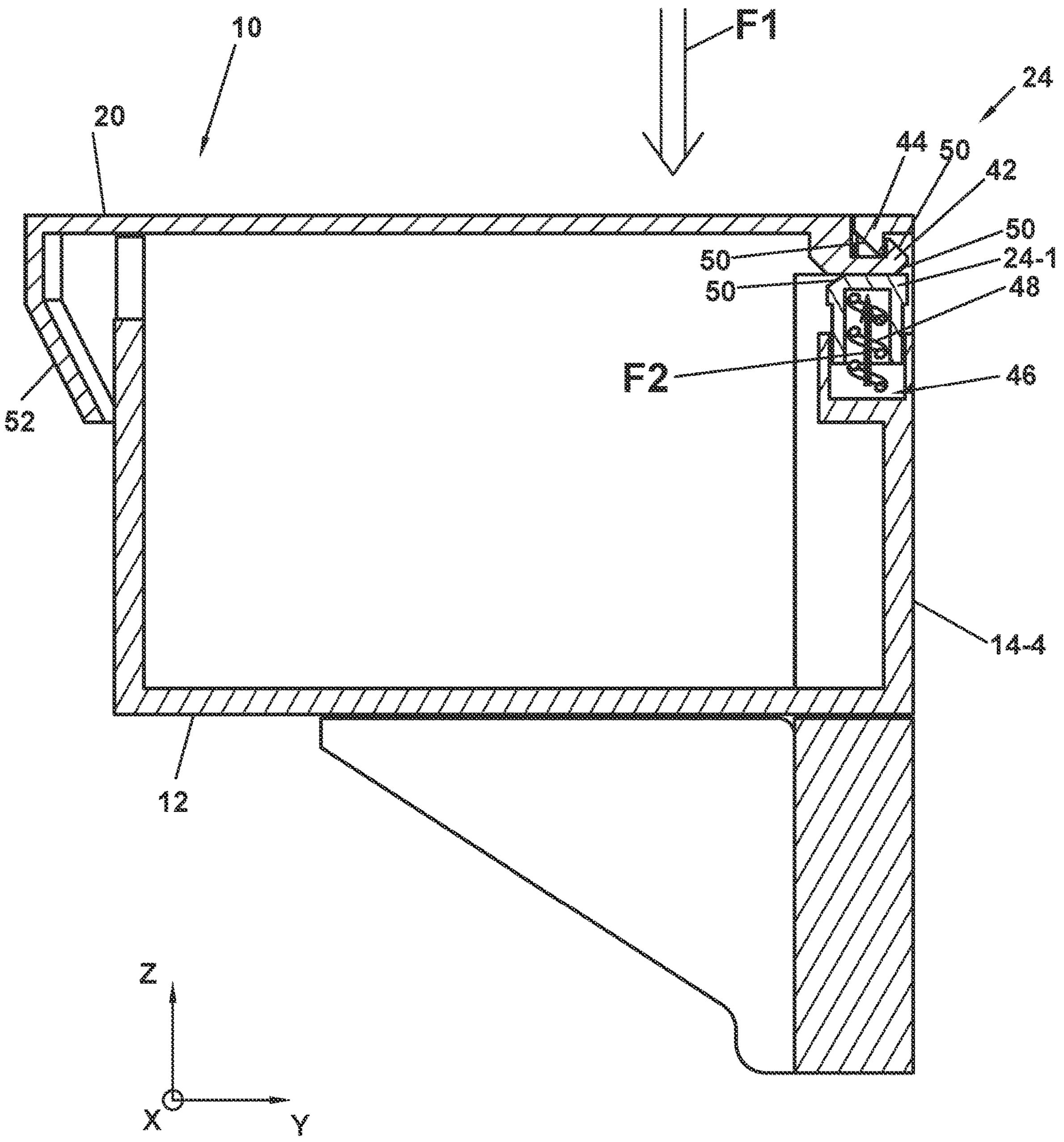
FIG. 10 illustrates a cross-sectional side view of the shelf assembly shown in FIGS. 1A-1C, depicting a cross-sectional side view of the latch mechanism according to an embodiment.

As shown in FIG. 10, the latch mechanism 24 may include a catch 42 mounted to the shelf 20 and a flange 44 mounted to the fourth lateral side 14-4, or vice versa—the catch may be mounted to the shelf while the flange 44 may be mounted to the fourth lateral side. The illustrated catch 42 is configured to engage and clasp the flange 44. The shelf surface 22 may be constructed from a flexible or springy material configured to deflect or bend and thereby release the catch 42 from the flange 44 when the shelf is subjected to an actuation force F1 (shown in FIGS. 8A, 10, and 11) perpendicular to the shelf surface 22 (i.e., depressed via a user) and the articulating support mechanism 26 has unblocked actuation of the latch mechanism 24. The latch mechanism 24 may include a plunger 24-1 mounted to the fourth lateral side 14-4 and configured to contact and press the catch 42 against the flange 44. The fourth lateral side 14-4 may include a pocket 46. The latch mechanism 24 may additionally include an elastic element 48, e.g., a coil spring, arranged and supported in the pocket 46, such as via a spring seat, and configured to urge the plunger 24-1 against the flange 44 via an elastic force F2.

Figure 11:
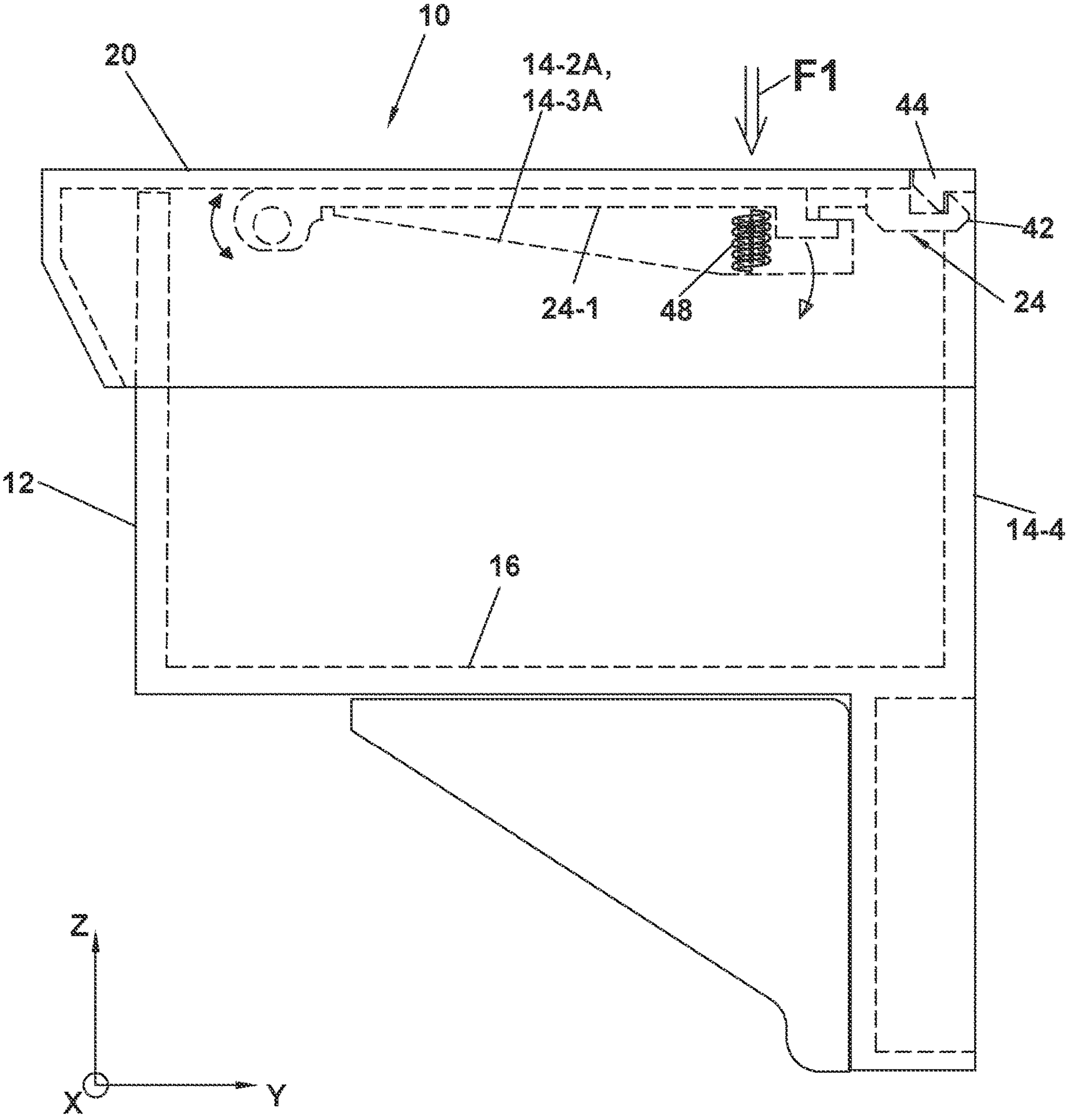
FIG. 11 illustrates a cross-sectional side view of the shelf assembly shown in FIGS. 1A-1C, depicting details of the latch mechanism according to another embodiment.

Each of the catch 42, the flange 44, and the plunger 24-1 may include a respective beveled contact surface 50 configured to deflect the catch around the flange and shift the plunger via the catch against the elastic force F2. The subject beveled surfaces 50 may therefore facilitate deflection of the catch 42 around the flange 44 to lock the shelf 20 to the receptacle 12 in the closed position P1. As shown in FIG. 11, each of the second and third lateral sides 14-2, 14-3 of the receptacle 12 may include a respective relief 14-2A, 14-3A, e.g., localized reduced wall height, configured to facilitate selective deflection of the catch 42 around the flange 44. Such deflection of the of the catch 42 may be useful for locking of the shelf 20 to the receptacle 12 in the closed position P1 and for unlocking and shifting of the shelf into the open position P2. Accordingly, the first lateral side 14-1 and the fourth lateral side 14-4 of the receptacle 12 may have a greater height than each of the second and third lateral sides 14-2, 14-3.

With resumed reference to FIGS. 1A, 1B, 2A, and 2B, the shelf 20 may include a skirt 52. The skirt 52 may include respective first, second, and third skirt portions 52-1, 52-2, 52-3 (identified in FIG. 3B). The second and third skirt portions 52-2, 52-3 may be configured to overhang and cover the corresponding reliefs 14-2A, 14-3A on the respective second and third lateral sides 14-2, 14-3 of the receptacle 12. As shown in FIG. 3B, the second and third skirt portions 52-2, 52-3 may define respective channels 54. The second and third lateral sides 14-3, 14-4 of the receptacle 12 may additionally define respective ledges 56 configured to match up and engage with the respective channels 54. The ledges 56 and the respective channels 54 thereby facilitate sliding engagement of the shelf 20 relative to the receptacle 12 between the open position P1 and the closed position P2. The fourth lateral side 14-4 may define at least one aperture 58 configured to accept a fastener for mounting the shelf assembly 10 to an object, such as a structural wall or a cabinet. The fourth lateral side 14-4 may additionally define a recess configured to house the articulating support mechanism 26. The recess 60 is intended to be concealed by the mounting surface of an object to which the shelf assembly 10 is attached.

With resumed reference to FIG. 11, the catch 42 and the flange 44 of the latch mechanism 24 may be separated from the elastic element 48 and plunger 24-1 subassembly. For example, each of the elastic element 48 and the plunger 24-1 may include two separate components, one of each arranged on the second lateral side 14-2 and the other of each arranged on the third lateral side 14-3. In such an embodiment, each plunger 24-1 and elastic element 48 may be pivotably mounted in the respective reliefs 14-2A, 14-3A of the corresponding second and third lateral sides 14-2, 14-3. Upon application of the actuation force F1, each plunger 24-1 may pivot down toward the floor 16 and permit the shelf 20 to similarly pivot and release the catch 42 from the flange 44.

Figure 12A:
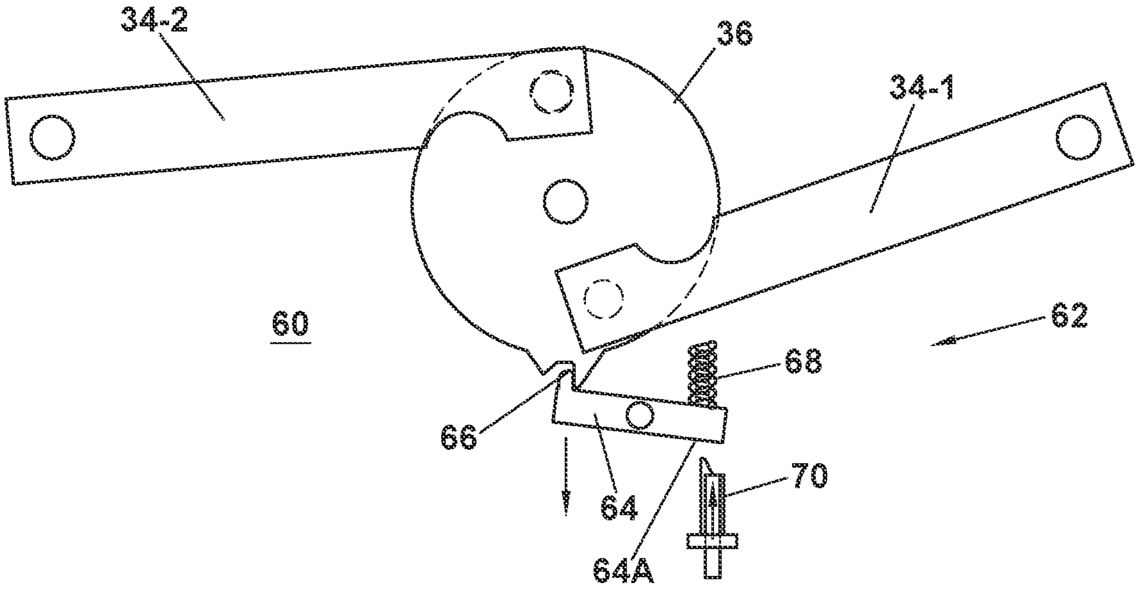
FIG. 12A illustrates a pawl mechanism configured to selectively block and unblock movement of the articulating support mechanism, depicting a dog engaged with the seesaw element and the articulating support mechanism in a locked position and a key for unlocking or disengaging the pawl mechanism, according to the disclosure.
Figure 12B:
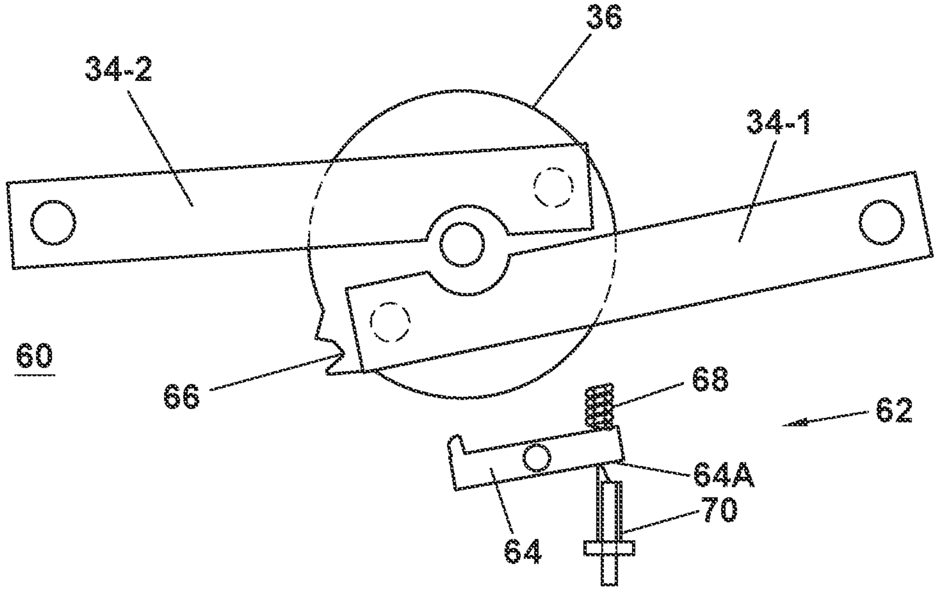
FIG. 12B illustrates the pawl mechanism and the key shown in FIG. 12A, depicting the dog from the seesaw element of the pawl mechanism disengaged by the key and movement of the articulating support mechanism unblocked, according to the disclosure.

With reference to FIGS. 12A and 12B, the shelf assembly 10 may also include a pawl mechanism 62 configured to selectively block and unblock movement of the articulating support mechanism 26. As shown, the pawl mechanism 62 may be packaged within the recess 60 in the fourth lateral side 14-4 along with the articulating support mechanism 26. The pawl mechanism 62 may include a dog 64 configured to pivotably engage a groove or notch 66 in the seesaw element 36 to block the seesaw element's pivoting action. Accordingly, at rest, the pawl mechanism 62 is configured to lock the articulating support mechanism 26 in position where the first and second rotatable buttresses 28-1, 28-2 are in their first orientation $O_1$ and the actuation of the latch mechanism 24 is blocked. The dog 64 is loaded by a spring 68 into engagement with the groove 66 to block movement of the seesaw element 36 and actuation of the latch mechanism 24, and access to the compartment 18. As shown, the dog 64 includes a contact surface 64A.

Figure 12C:
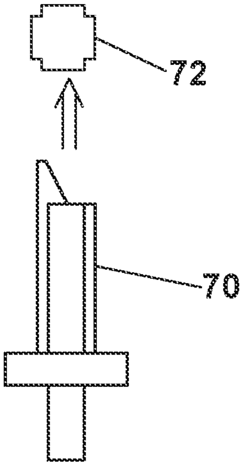
FIG. 12C illustrates an embodiment of the key shown in FIG. 12A for slotting engagement with a complementarily shaped opening in a side of the shelf assembly, according to the disclosure.
Figure 12D:
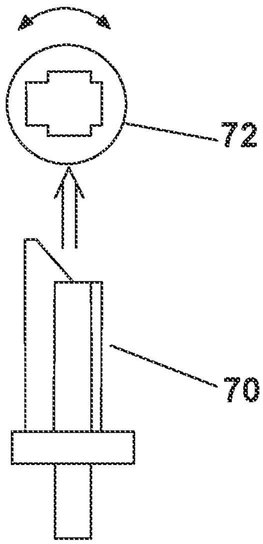
FIG. 12D illustrates another embodiment of the key shown in FIG. 12A for slotting engagement with a complementarily shaped opening having a selectable orientation relative to a side of the shelf assembly, according to the disclosure.

A key 70 (shown in FIGS. 12A-12D) may be adapted to engage and be inserted into a specially shaped opening or slot 72 arranged in a particular orientation in the fourth lateral side 14-4 and extending into the recess 60. The key 70 position and orientation of the opening 72 with respect to the position of the dog 64 may be selectable by the user of the shelf assembly 10 to actuate the dog at the contact surface 64A against the action of the spring 68 and release the seesaw element 36 to enable access to the compartment 18. FIGS. 12C and 12D illustrate separate embodiments of the key 70 for slotting engagement with a respective complementarily shaped opening 72. As shown, the opening 72 may have either a symmetrical (FIG. 12C) or an asymmetrical (FIG. 12D) shape. For example (as shown), the opening 72 may have a crisscross shape corresponding to a cross-sectional shape of the key 70. The key 70 may be supplied in ready-to-use configuration or be modifiable by the end user either in its cross-sectional or plan view. For example, the key 70 may have one asymmetrically positioned prong that is longer than the other three (as shown in FIGS. 12A-12D) for exerting a releasing force against the contact surface 64A. Orientation of the asymmetrical opening 72 may, for example, be user rotatable relative to the fourth lateral side 14-4 (as indicated by the double-headed arrow in FIG. 12D), to permit the shape of the key 70 (such as the elongated prong) to be matched up with the position of the contact surface 64A. In the event of forced manipulation of and blind tampering with the pawl mechanism 62 through the opening 72, the articulating support mechanism 26 may become dismembered, further challenging unauthorized access to the compartment 18.

Overall, the shelf assembly 10 is a storage device having an exposed shelf and a hidden compartment 18 accessed by a sequential multi-stage lock. As employed herein, the term "multi-stage" defines a mechanism intended to selectively lock and unlock the shelf assembly 10 in multiple successive steps. Operation of the sequential multi-stage lock includes external actuation of the articulating support mechanism 26 preceding actuation of the latch mechanism 24 to enable access to the compartment 18. The pawl mechanism 62 may be used to selectively unblock actuation of the articulating support mechanism 26 as a first step in the process. The shelf assembly 10 may, for example, be installed in a house, office, boat, or RV. The shelf assembly 10 may be utilized for security of personal or business items despite being arranged in full public view. The shelf assembly 10 may be constructed from a flexible material, such as a polymer, or from a rigid material such as wood or metal.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

What is claimed is:

1. A shelf assembly comprising:

a receptacle having first, second, third, and fourth lateral sides and a receptacle floor configured to define a compartment;

a shelf configured to engage the receptacle at the second and third lateral sides and slide along the second and third lateral sides between a closed position to thereby cover and hide the compartment and an open position to thereby expose the compartment;

a sequential multi-stage lock configured to control access to the compartment, wherein the sequential multi-stage lock includes:

a latch mechanism configured to selectively lock the shelf to the receptacle in the closed position and unlock the shelf to facilitate shifting of the shelf into the open position; and an articulating support mechanism configured to selectively block actuation of the latch mechanism to maintain closed position of the shelf and unblock actuation of the latch mechanism to facilitate sliding of the shelf into the open position to expose the compartment; and at least one moveable buttress mounted to the fourth lateral side and operatively connected to the articulating support mechanism.

2. The shelf assembly of claim 1, wherein the articulating support mechanism includes at least one rod operatively connected to the at least one moveable buttress and configured to shift along the fourth lateral side and to support the shelf in the closed position to thereby block actuation of the latch mechanism.

3. The shelf assembly of claim 2, wherein the at least one rod includes a first rod and a second rod, each configured to extend perpendicular to the receptacle floor to support the shelf in the closed position and thereby block actuation of the latch mechanism.

4. The shelf assembly of claim 3, wherein the articulating support mechanism additionally includes a linkage configured to operatively connect and shift each of the first and second rods.

5. The shelf assembly of claim 4, wherein:

the linkage includes a first link, a second link, and a seesaw element;

the first link is pivotably connected to each of the seesaw element and the first rod;

the second link is pivotably connected to each of the seesaw element and the second rod; and the linkage is thereby configured to shift the respective first and second rods synchronously to selectively block and unblock actuation of the latch mechanism.

6. The shelf assembly of claim 5, wherein the sequential multi-stage lock additionally includes a pawl mechanism configured to selectively block and unblock movement of the seesaw element.

7. The shelf assembly of claim 6, wherein:

the pawl mechanism includes a dog configured to pivotably engage a groove in the seesaw element; and the dog is loaded by a spring into engagement with the groove to block movement of the seesaw element and actuation of the latch mechanism.

8. The shelf assembly of claim 3, wherein the articulating support mechanism includes a first rotatable cam operatively connected to the first rod and a second rotatable cam operatively connected to the second rod.

9. The shelf assembly of claim 8, wherein the at least one moveable buttress is arranged between the receptacle floor and the fourth lateral side and includes a first rotatable buttress operatively connected to the first cam and a second rotatable buttress operatively connected to the second cam.

10. The shelf assembly of claim 1, wherein the latch mechanism includes a catch mounted to the shelf and a flange mounted to the fourth lateral side or vice versa, and wherein the catch is configured to engage and clasp the flange.

11. The shelf assembly of claim 10, wherein the shelf includes a shelf surface constructed from a flexible material configured to deflect to release the catch from the flange when the shelf is subjected to an actuation force perpendicular to the shelf surface and the articulating support mechanism has unblocked actuation of the latch mechanism.

12. The shelf assembly of claim 10, wherein the latch mechanism includes a plunger mounted to the fourth lateral side and configured to contact and press the catch against the flange.

13. The shelf assembly of claim 12, wherein the fourth lateral side includes a pocket, and wherein the latch mechanism additionally includes an elastic element arranged in the pocket and configured to urge the plunger against the flange via an elastic force.

14. The shelf assembly of claim 13, wherein each of the catch, the flange, and the plunger includes a respective beveled contact surface configured to deflect the catch around the flange and shift the plunger via the catch against the elastic force to thereby facilitate deflection of the catch around the flange to lock the shelf to the receptacle in the closed position.

15. The shelf assembly of claim 13, wherein each of the second and third lateral sides of the receptacle includes a relief configured to facilitate selective deflection of the catch around the flange for locking of the shelf to the receptacle in the closed position and deflection of the catch around the flange for unlocking and shifting of the shelf into the open position.

16. The shelf assembly of claim 15, wherein the first lateral side of the receptacle has a greater height than each of the second and third lateral sides.

17. The shelf assembly of claim 15, wherein the shelf includes a skirt having a first, second, and third skirt portions, and wherein the second and third skirt portions are configured to overhang and cover the respective relief on each of the second and third lateral sides of the receptacle.

18. The shelf assembly of claim 17, wherein each of the second and third skirt portions defines a respective channel and each of the second and third lateral sides of the receptacle defines a corresponding ledge configured to match up with the respective channel to thereby facilitate sliding engagement of the shelf relative to the receptacle.

* * * * *